UNITED STATES PATENT OFFICE.

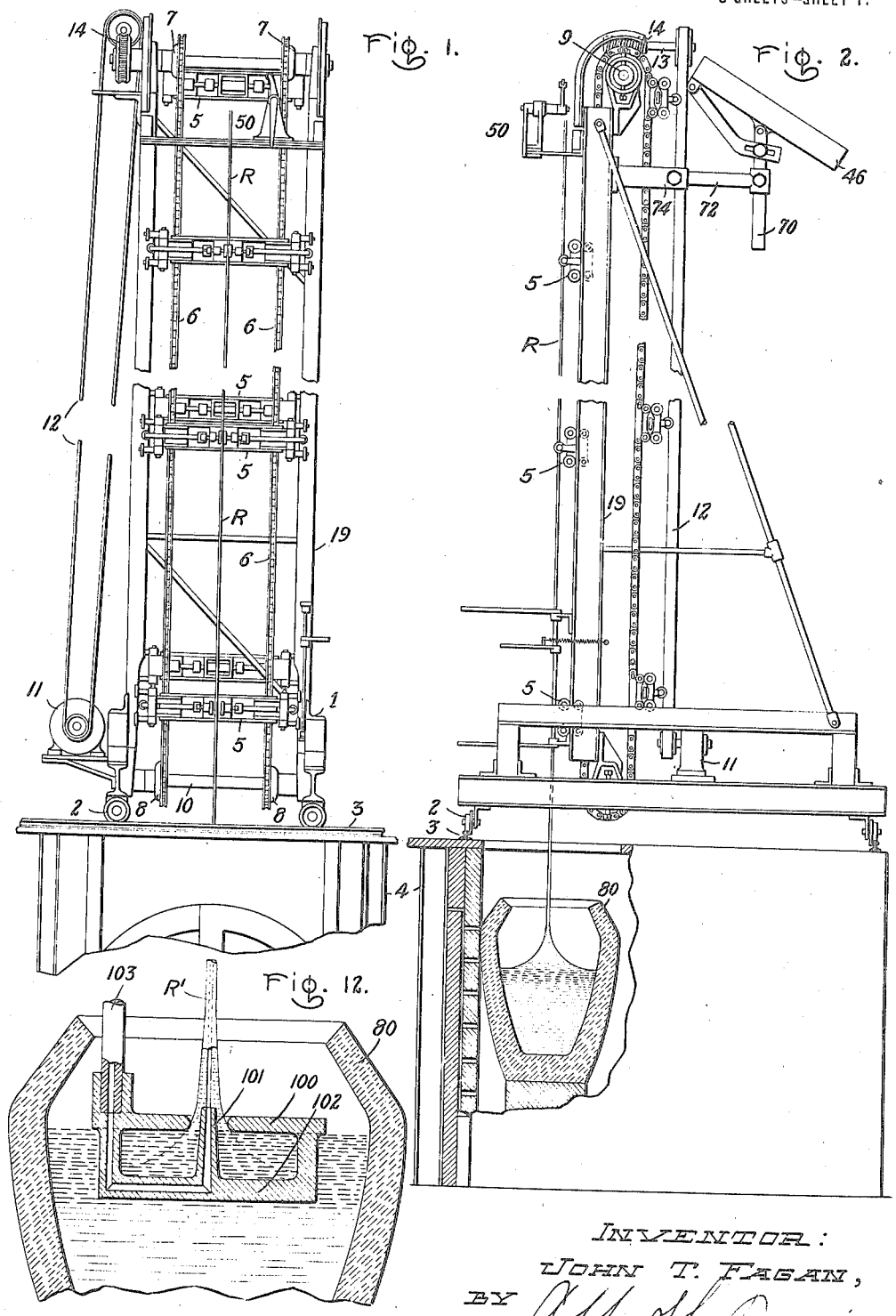

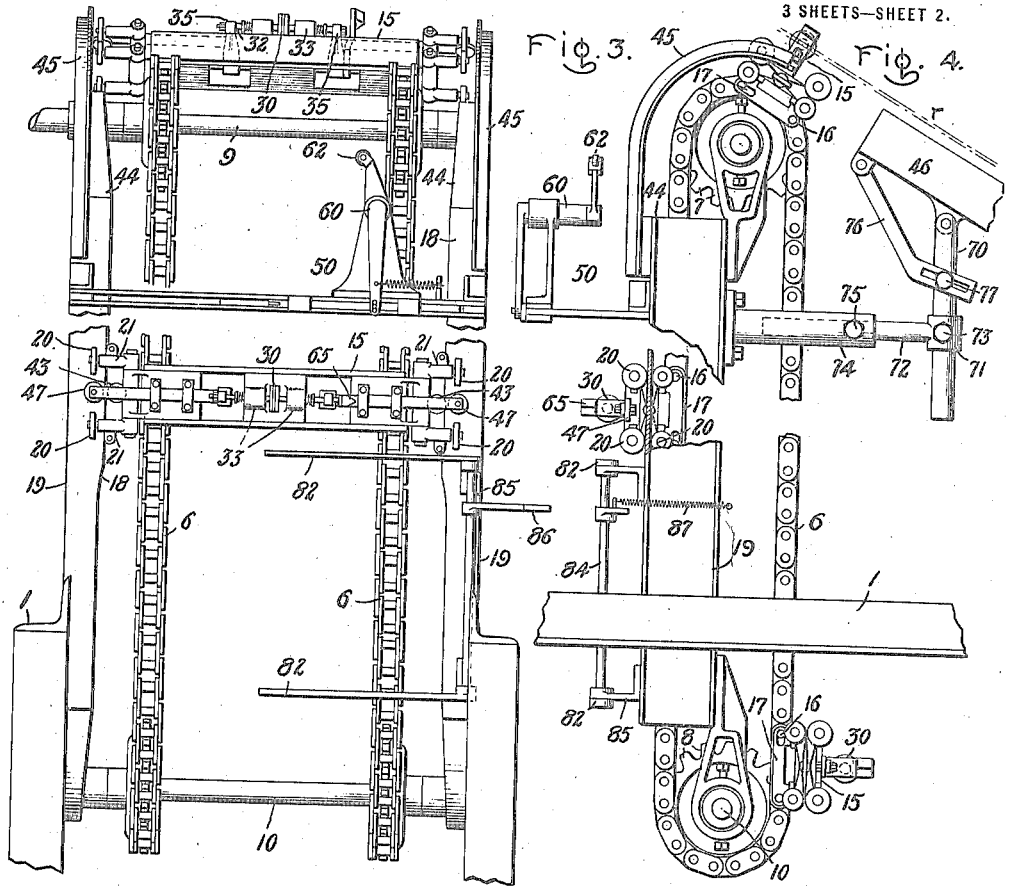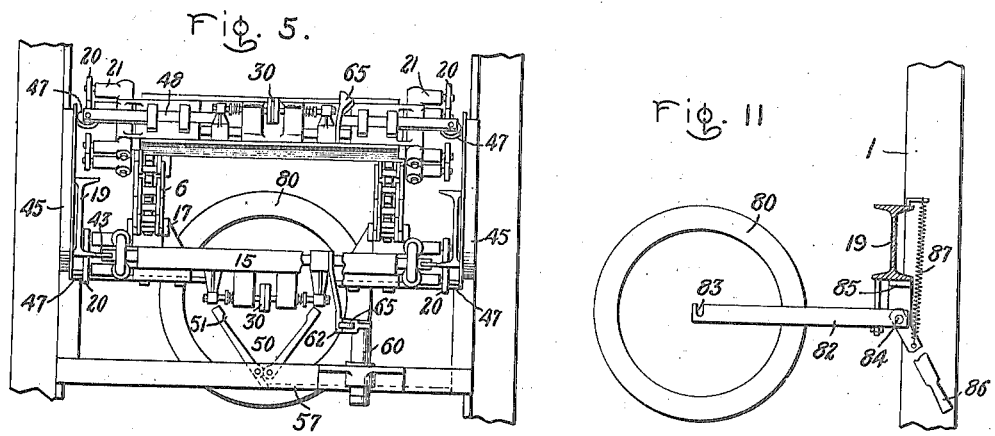

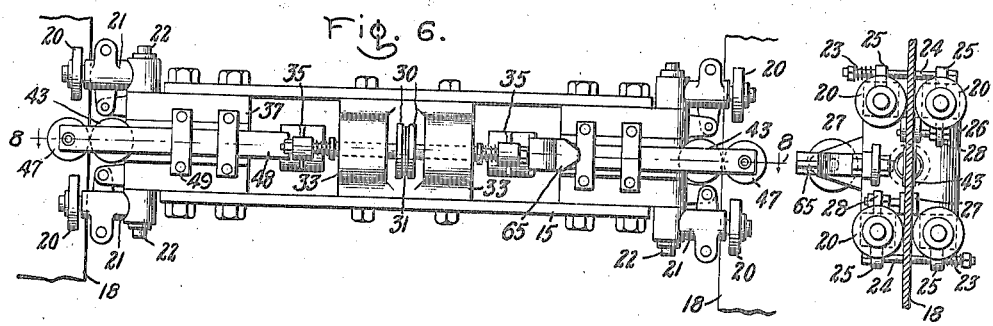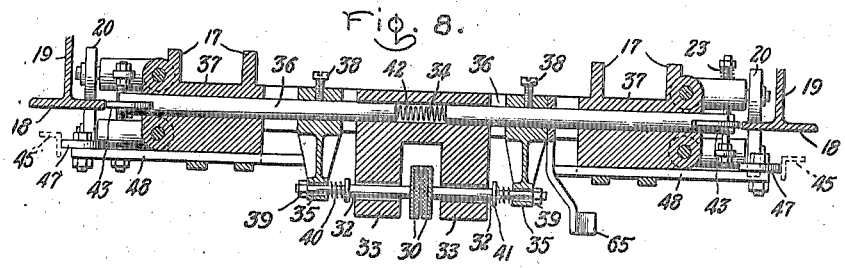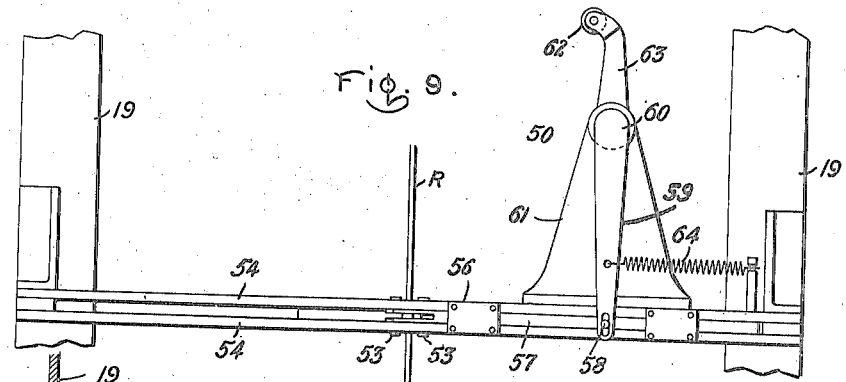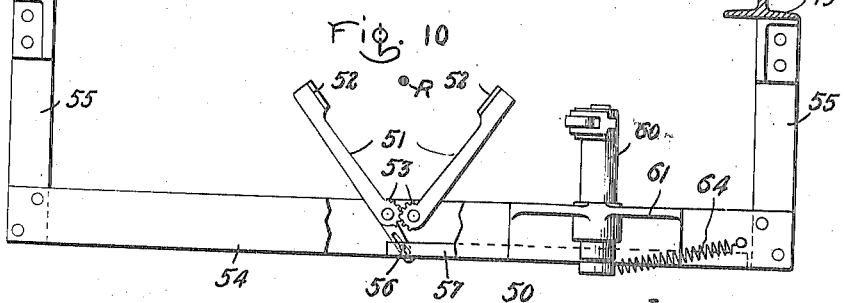

JOHN T. FAGAN, OF CLEVELAND, OHIO, ASSIGNOR TO GENERAL ELECTRIC COMPANY, A CORPORATION OF NEW YORK.

MANUFACTURE OF GLASS RODS AND TUBES.

1,273,346.      Specification of Letters Patent.      Patented July 23, 1918.

Original application Serial No. 771,407, filed June 3, 1913. Divided and this application filed July 20, 1916. Serial No. 110,390.

*To all whom it may concern:*

Be it known that I, JOHN T. FAGAN, a citizen of the United States, residing at Cleveland, in the county of Cuyahoga, State of Ohio, have invented certain new and useful Improvements in the Manufacture of Glass Rods and Tubes, of which the following is a specification.

This application is a division of my prior application, Serial No. 771,407, filed June 3, 1913.

My invention relates to the working of glass and the like, and particularly to the production of cane glass and tubing.

According to one method heretofore practised, both solid and hollow cane glass have been produced by drawing out a piece of glass in a "gallery", two persons taking hold of the ends of the piece of glass and walking away from one another, and the glass being thus drawn out into a long rod or thread which quickly cooled and was then cut up into convenient lengths. According to another method, a so-called "bait" was immersed in a body of heated glass and then pulled upward and the glass drawn up after it to whatever extent the height of the building or the like allowed, the solidified thread or rod being then cut into lengths and the bait brought down to the supply of glass for a repetition of the operation.

Both the methods just described have the disadvantage that the operations involved are not continuous and that in practice they require a great deal of space, as well as various other well known disadvantages that it is not necessary to specify. Among the more important advantages obtainable through my invention as compared with such methods are continuity of operation, uniformity of product, and rapidity and cheapness of production. In addition to these, my invention affords the other well known advantages of manufacture by machinery which is entirely automatic and continuous in its operation.

I have hereinafter described specifically the production of solid cane glass and tubing in accordance with my invention by means of a glass working machine which is adapted for continuous automatic operation and can be made to deliver its product in convenient standard lengths. While, also, the invention extends to this mechanism and to its specific features and details of operation and construction,—which are of importance because of their special advantages,—yet it is not confined to this machine and its details, but can be otherwise carried out and applied. Various advantages obtainable in connection with my invention besides those above mentioned will hereinafter become apparent, and its scope will be indicated in my claims.

The machine which I shall describe is adapted to take suitably heated or molten glass from any suitable supply,—such as a mass of heated glass that has been rolled, blown, or otherwise prepared more or less nearly as for drawing by hand in a gallery, or an ordinary glass pot in a furnace,—to form cane glass and tubing of any desired size therefrom, and to cut this glass into definite lengths and deliver or discharge it to any suitable receiving means, these operations being performed automatically and either continuously or repeatedly without any limitation except the exhaustion of the supply of heated glass. In the operation of this machine, the soft glass is continually drawn from the supply directly into rod form by an upward pull exerted on it through a portion previously drawn out and solidified,—the size of the solidified rod being determined by the rate of speed at which the glass is pulled and its initial temperature, as well as by its composition and the like, just as is the case in the method of intermittently drawing with a bait above described. Glass rod about $\frac{1}{8}$ to $\frac{3}{16}$ inches in diameter, for example, can be produced with the machine hereinafter described by pulling at the rate of 40 to 60 feet per minute from a pot of ordinary lead glass (such as incandescent lamp bulbs are made of) maintained at a temperature of about 1,000 to 1,200° F.

In the machine hereinafter described, the drawing of the glass is effected by gripping means or devices which successively take hold of the solidified rod or thread at suitable intervals and travel upward with it, and concurrently with the continuous drawing of the rod it is from time to time automatically cut at definite intervals by means whose action bears a definite relation to the travel of the gripping means and released from the latter and delivered to the receiving means. After having thus participated in a complete cycle of operations, each gripping device returns downward to take a fresh hold upon the glass and travel upward with it again, etc. As the gripping devices thus travel continually up and down, they are in this machine successively caused to grip the glass rod or to release it by relatively stationary means which they encounter in their travel. The cutting means, on the contrary, remains relatively stationary and is intermittently brought into action by parts which travel along with the gripping devices.

In the accompanying drawings, Figure 1 is a front elevation of a machine constructed in accordance with my invention, certain intermediate portions being broken away in order that the machine as a whole may appear within the limits of the drawing.

Fig. 2 is a similar side elevation, certain parts being shown in section.

Figs. 3 and 4 are detail views similar to Figs. 1 and 2 but on a larger scale showing the construction of various parts or indicating their mode of operation.

Fig. 5 is a plan view corresponding to Fig. 3.

Fig. 6 is a front elevation on a larger scale of a device or mechanism appearing in Figs. 1 to 5 inclusive; Fig. 7 is an end view of the same; and Fig. 8 is a plan view showing various parts as in section at a horizontal surface corresponding to the line 8—8 of Fig. 6.

Fig. 9 is a detail front elevation upon an enlarged scale of certain of the mechanism appearing in Figs. 1 to 5 inclusive; and Fig. 10 is a corresponding plan view, a portion of one of the parts shown being broken away.

Fig. 11 is a fragmentary detail plan view similar to Fig. 3 illustrating the operation of certain parts not shown in Fig. 3.

Fig. 12 is a sectional view of the furnace and float adapted to the drawing of hollow glass or tubing.

As will be seen from Figs. 1, 2 and others, the operating parts of the machine are mounted on a frame structure 1 supported on wheels 2 which allow it to travel on rails 3 extending along the top of a row of glass furnaces 4, so that the machine can easily be moved into position to take glass from the glass pot in any furnace, as occasion may require. As shown, the gripping devices 5 are carried along in a continuous up and down path by carrier means comprising a pair of vertically ascending belts having the form of sprocket chains 6 which travel over upper and lower sprocket wheels 7 and 8 on upper and lower horizontal shafts 9 and 10 mounted in bearings on the framework 1,— say some 10 to 15 feet apart. These chains 6 are driven by the upper sprocket wheels 7, power for this purpose being derived from any suitable source,—as, for example, a motor 11 which acts through a belt 12 to drive a horizontal shaft 13 extending at right angles to the shaft 9 and connected with it by a worm gearing 14. Provision for varying the speed at which the gripping devices 5 travel may be made by employing a variable speed motor or by some sort of variable speed gearing in the transmission The gripping devices 5 shown comprise suitable frame structures 15 attached to the chains 6 by pins or bolts 16 which pass through lugs 17 on the structures 15 and may also serve as pivots between adjacent links of the chains (Figs. 3, 4 and 5, etc.) They are guided in their upward movement by ways or guides 18 which, as shown, are formed by the flanges of the I-beam uprights 19 of the framework 1, rollers 20 being interposed between each end of each frame 15 and the corresponding guide 18. As shown, there are four of these rollers 20 at each end of each frame 15 arranged in two pairs one above the other, those of each pair traveling on opposite sides of the guides 18. As will be seen from Figs. 6, 7 and 8, the axes of the rollers 20 are at the ends of parts 21 which are pivoted on vertical pivots 22 on the framework 15, and the rollers of each pair are yieldingly but forcibly urged together upon the guide 18 between them by springs 23 acting upon the parts 21; as shown, a bolt 24 extends through lugs 25 on the part 21 which carries the rollers of each pair and the spring 23 is compressed between one of these lugs and the nut on the adjacent end of this bolt. In order to insure that the gripping device 5 shall always travel upward in exactly the same vertical path without any looseness or play, the part 21 which carries one of the rollers 18 of each pair is adjustably fixed in position by being clamped between the head of a bolt 26 which screws into a lug 27 on the structure 15 and a nut 28 on said bolt, the rollers shown as thus fixed being the rear one of the pair which is uppermost when the device 5 is ascending and the front one of the pair which is then lowermost.

Referring now to Figs. 3, 4, 5, 6, 7 and 8, it will be seen that each of the gripping devices 5 comprises a pair of jaws or grippers proper 30 adapted to come together upon the glass thread or rod R and grip it or to separate and release it, one of these movements being spring actuated and the reverse movement being brought about by stationary means adjacent the path of the device 5. In the particular construction shown, the opening of the grippers 30 is spring actuated, and they are closed and maintained closed by the action of the stationary means in question through yielding connections which limit the force with which they grip the rod R and so keep it from being crushed. The grippers 30, it will be seen, consists of round disks with asbestos pads 31 sunk in their acting faces, and they are mounted on spindles 32 which slide in bores in lugs 33 on a central portion 34 of the structure 15 (Fig. 8). The spindles 32 are actuated by arms or brackets 35 mounted on rods 36 which slide in bores in the central and the end portions 34 and 37 of the structure 15, the brackets 35 being adjustably secured on the rods 36 by set-screws 38. The outer ends of the spindles 32 (somewhat reduced in size) extend loosely through holes in the brackets 35 and have nuts 39 on them, and spiral springs 40 are interposed between the inner sides of the brackets 35 and washers or enlargements 41 on the spindles 32,—this construction forming the yielding connection above mentioned by which the action of the grippers 30 on the rod R is cushioned. As shown, (Fig. 8), the spiral spring 42 which causes the opening of the grippers 30 is arranged between the adjacent ends of the rods 36, in the bore in the part 34 in which the rods slide. The stationary means by which the grippers 30 are caused to close and for some time kept closed are the edges of the guides 18 acting through rollers 43 in slots in the outer ends of the rods 36, and the grippers 30 may be kept closed after the rollers 43 travel off the upper ends of the guides at 44 by short auxiliary ways or shoes 45 which extend on up and around the point where the devices 5 are to deliver the several rods to the receiving trough 46 (Fig. 4). As shown, the ways 45 do not act on the rollers 43, but on other rollers 47 at the outer ends of rods 48 which slide in grooves in the front faces of the parts 37 and are kept in place by straps 49, the inner ends of these rods 48 bearing against the outer sides of the arms 35 or against parts associated with them (Figs. 3, 4 and 5.) The grippers 30 may be caused to remain open as long as desired after the devices 5 begin their upward travel along the ways 18 by cutting away the edges of the ways as shown (Figs. 1 and 3), so that for a suitable distance up they shall be too far apart to force the grippers together.

In the machine shown, the lengths $r$ into which the thread or rod R is cut correspond to the distances apart of successive gripping devices 5, and the severance is preferably effected a short distance below each gripping device 5 as it approaches the upper end of its path of travel, before the delivery to the receiving trough 46. As will be seen from Figs. 3, 4, 5, 9 and 10, the cutting mechanism 50 comprises two parts 51 whose relatively heavy outer ends swing together upon the glass thread R and crush and shatter it, being provided with suitably beveled or otherwise sharpened edge portions 52 for this purpose. These parts 51 are pivoted at 53 between bars 54 attached to brackets 55 which are in turn secured to the uprights 19, and they have intermeshing teeth adjacent their pivots 53 which cause them to swing in unison (Figs. 9 and 10). As will be seen from Fig. 10, one of the parts 51 extends back beyond its pivot 53 and is connected by a pin and slot connection 56 with the forked end of a rod 57 adapted to slide between the bars 54, and this rod 57 is connected by another pin and slot connection 58 with one arm 59 of a bell-crank lever 60 fulcrumed in a bracket 61 secured to the bars 54 and having a roller 62 at the end of its other arm 63. Owing to a spring 64 which acts on the arm 59 of the bell-crank, the parts 51 are normally swung apart as shown in Fig. 10, so that the glass thread R and the grippers 30 may pass between them; but as each device 5 rises above the parts 51 a cam means comprising a part 65 having an inclined acting face (see Figs. 6, 7 and 8) attached to one of the arms 35 encounters the roller 62 and causes the parts 51 to swing together upon the glass thread R below the device 5 in question and sever it.

After a length of rod $r$ has thus been detached from the upper end of the thread R, the continuing movement of the device 5 which still grips it will carry it on up, and it will swing over as the device 5 passes over the sprocket wheel 7 until it comes into the position indicated in dotted lines in Fig. 4, when the rollers 47 will travel off the ends of the ways 45 and the grippers 30 will open and allow the rod $r$ to drop into the chute 46. The chute 46 may conveniently be mounted on the frame work 1 in any manner which will render it freely adjustable. As shown, it is pivoted to the upper end of a short rod 70 adapted to slide in a hub 71 on a horizontal arm 72, a set-screw 73 by which the rod 70 can be secured at any desired height being provided, and the arm 72 is in turn slidably mounted in a hub 74 attached to some part of the frame-work 1 and similarly provided with a set-screw 75. Provision for tilting the chute 43 as desired may be made by means of a slotted link 76 having its upper end pivoted to the trough and adapted to be clamped to the rod 70 by a screw 77.

When the machine is to be started, an initial thread of glass can be drawn up from the pot 80 by hand by means of an iron rod commonly known as a "bait"; and to insure that this thread of glass shall be drawn from a point in the pot directly in line with the path of travel of the jaws 30, guiding means for guiding the bait may be provided. As will be seen from Figs. 1, 2, 3, 4 and 11, such guiding means may consist of a pair of suitably spaced arms 82 having in their ends holes or notches 83 for the bait. These arms 82 can conveniently be mounted on a vertical rod or shaft 84 having bearings in brackets 85 secured to one of the uprights 19 so that they may swing back out of the path of the gripping devices 5 as soon as they have served their purpose (Figs. 1 and 2). For swinging this bait guide into place (Figs. 3, 4 and 11) a handle 86 attached to the shaft 84 may be employed, and a spring 87 may be connected to this handle to cause the guide to swing back out of the way automatically. As soon, therefore, as the operator has run the bait down into the pot and manipulated it to cause the glass to adhere to it and drawn it up again with a thread of glass hanging from it, he will let the bait guide swing back and start the machine, and then insert the thread of glass R between the grippers 30 of one of the ascending devices 5 before they close,—after which the grippers of the next device 5 will of themselves take hold of the thread R and the drawing up of the glass and the other operations will go on automatically as already described. If desired, the coming of the thread of glass between each pair of jaws 30 so as to be properly gripped by them may be insured by means of a guide comprising an arm with a hole or eye at its end arranged like one of the guide arms 82 above mentioned, but low enough not to lie in the path of the jaws 30; or a slender guide part located just below where the jaws 30 close may be arranged so that the open jaws can pass at each side of it. However, nothing of this sort will be necessary if the thread of glass R is drawn from the middle of the pot and the upward part of the jaws is directly in line with the middle of the pot, or even, in general, if the thread of glass is merely drawn from the pot at a point directly in line with the upward path of the jaws.

Referring to Fig. 12, a float 100 may be conveniently used for drawing small hollow glassware, as tubing. This float is essentially a plate of refractory material, such as graphite, with an opening through the center through which the tubing R' is drawn. A nozzle 101 for supplying air pressure to the interior of the tubing R' projects upwardly through the opening in the plate and is carried by a cross-bar 102, the latter preferably being integral with downwardly depending legs from the plate 100. The nozzle is in communication with the pipe 103 leading to a source of air pressure (not shown), this communication being established through a passage provided in the bar 102 and one of the legs, as shown. The float may be supported in any convenient manner with reference to the level of the molten glass, as by means of the pipe 103. The air supply also serves as a cooling medium for the float, and other additional cooling means may be employed.

It is to be understood that the production of heavy sheet and cylinder glass is not included within the scope of my invention which is restricted to the production of cane or rod and tubing not exceeding one inch in diameter. The terms " cane," " rod " and " tubing " as used throughout this specification are intended to indicate drawn glassware within this limit.

What I claim as new and desire to secure by Letters Patent of the United States, is:—

1. The method of producing glass cane or tubing which consists in continuously drawing a thread or rod from a supply of heated glass and concurrently with the continuous drawing of the rod or thread intermittently detaching lengths therefrom.

2. The method of producing glass cane or tubing continuously from a supply of heated glass which consists in drawing an initial thread or rod from the supply and thereafter gripping the thread or rod itself to continue drawing it, from time to time taking a fresh grip near the supply and releasing the grip farther on so that the drawing may go on uninterruptedly, and concurrently with the continuous drawing of the thread or rod from time to time detaching and removing lengths therefrom.

3. The method of producing cane glass or glass tubing continuously from a supply of molten glass which consists in drawing an initial rod or tube from the supply and thereafter gripping the rod or tube itself to continue drawing it, from time to time taking a fresh grip near the supply and releasing the grip farther on so that the drawing may go on uninterruptedly, and concurrently with the continuous drawing of the rod or tube from time to time detaching and removing lengths therefrom.

4. The method of producing lengths of cane glass or glass tubing from a supply of molten glass which consists in drawing an initial rod or tube from the supply, gripping the rod or tube to continue drawing it, taking a second grip near the supply and thereafter breaking the rod or tube at a point between said grips whereby the detached length is free to be carried to a depository.

5. The method of producing lengths of cane glass or glass tubing from a supply of molten glass which consists in continuously repeatedly drawing the rod or tubing from the supply container by gripping the drawn rod or tubing at two or more points simultaneously, detaching the rod or tubing at a point between two of the grips and thereafter carrying the detached section to a depository and releasing the grip.

6. The method of producing glass cane or tubing which consists in continuously drawing up a thread or rod from a supply of heated glass and concurrently with the continuous drawing up of the rod or thread intermittently detaching lengths from its upper end.

7. The method of producing glass cane or tubing continuously from a supply of heated glass which consists in drawing up an initial thread or rod from the supply and thereafter gripping the thread or rod itself to continue drawing it up, from time to time taking a fresh grip near the supply and releasing the grip higher up so that the drawing may go on uninterruptedly, and concurrently with the continuous drawing up of the thread or rod from time to time detaching and removing lengths from its upper end.

8. The method of producing cane glass or glass tubing continuously from a supply of molten glass which consists in drawing up an initial rod or tube from the supply and thereafter gripping the rod or tube itself to continue drawing it up, from time to time taking a fresh grip near the supply and releasing the grip higher up so that the drawing may go on uninterruptedly, and concurrently with the continuous drawing up of the rod or tube from time to time detaching and removing lengths from its upper end.

9. The method of producing lengths of cane glass or glass tubing from a supply of molten glass which consists in drawing up an initial rod or tube from the supply, gripping the rod or tube to continue drawing it up, taking a second grip near the supply and thereafter breaking the rod or tube at a point between said grips whereby the detached length is free to be carried to a depository.

10. The method of producing lengths of cane glass or glass tubing from a supply of molten glass which consists in continuously and repeatedly drawing upward the rod or tubing from the supply container by gripping the drawn rod or tubing at two or more points simultaneously, detaching the rod or tubing at a point between the two uppermost grips and thereafter carrying the detached section to a depository and releasing the grip.

In witness whereof, I have hereunto set my hand this 18th day of July, 1916.

JOHN T. FAGAN.